United States Patent [19]
Blaskowski et al.

[11] 3,849,662
[45] Nov. 19, 1974

[54] COMBINED STEAM AND GAS TURBINE POWER PLANT HAVING GASIFIED COAL FUEL SUPPLY

[75] Inventors: Henry John Blaskowski, West Simsbury; Robert Willis Koucky, West Hartford, both of Conn.

[73] Assignee: Combustion Engineering, Inc., Windsor, Conn.

[22] Filed: Jan. 2, 1973

[21] Appl. No.: 320,364

[52] U.S. Cl............ 290/2, 290/52, 307/64, 60/12, 60/39.18
[51] Int. Cl............................................. F02c 1/04
[58] Field of Search.......... 290/1, 2, 52; 60/39.18 B, 60/12; 307/64, 65

[56] References Cited
UNITED STATES PATENTS

| | | | |
|---|---|---|---|
| 1,846,389 | 2/1932 | Gay | 60/39.18 B |
| 2,663,146 | 12/1953 | Legendre | 290/2 |
| 2,675,672 | 4/1954 | Schovner | 60/39.12 |
| 2,920,211 | 1/1960 | Gotol | 290/2 |
| 3,151,250 | 9/1964 | Carlson | 290/52 |
| 3,394,265 | 7/1968 | Hendrickson | 290/2 |
| 3,446,014 | 5/1969 | FosterPegg | 60/39.12 |
| 3,704,586 | 12/1972 | Bruns | 60/39.18 |

Primary Examiner—G. R. Simmons
Attorney, Agent, or Firm—Frederick A. Goettel, Jr.

[57] ABSTRACT

A combined cycle power generating plant is provided in which both the steam turbine and the gas turbine burn gasified coal as a fuel. The steam turbine meets base and intermediate power demands and during these periods the gas produced in the gasifier in excess of what is burned in the steam generator is compressed and stored in a gas holder. When peaking power is needed the gas turbine is fired using the gas stored during the periods of low demand.

8 Claims, 1 Drawing Figure

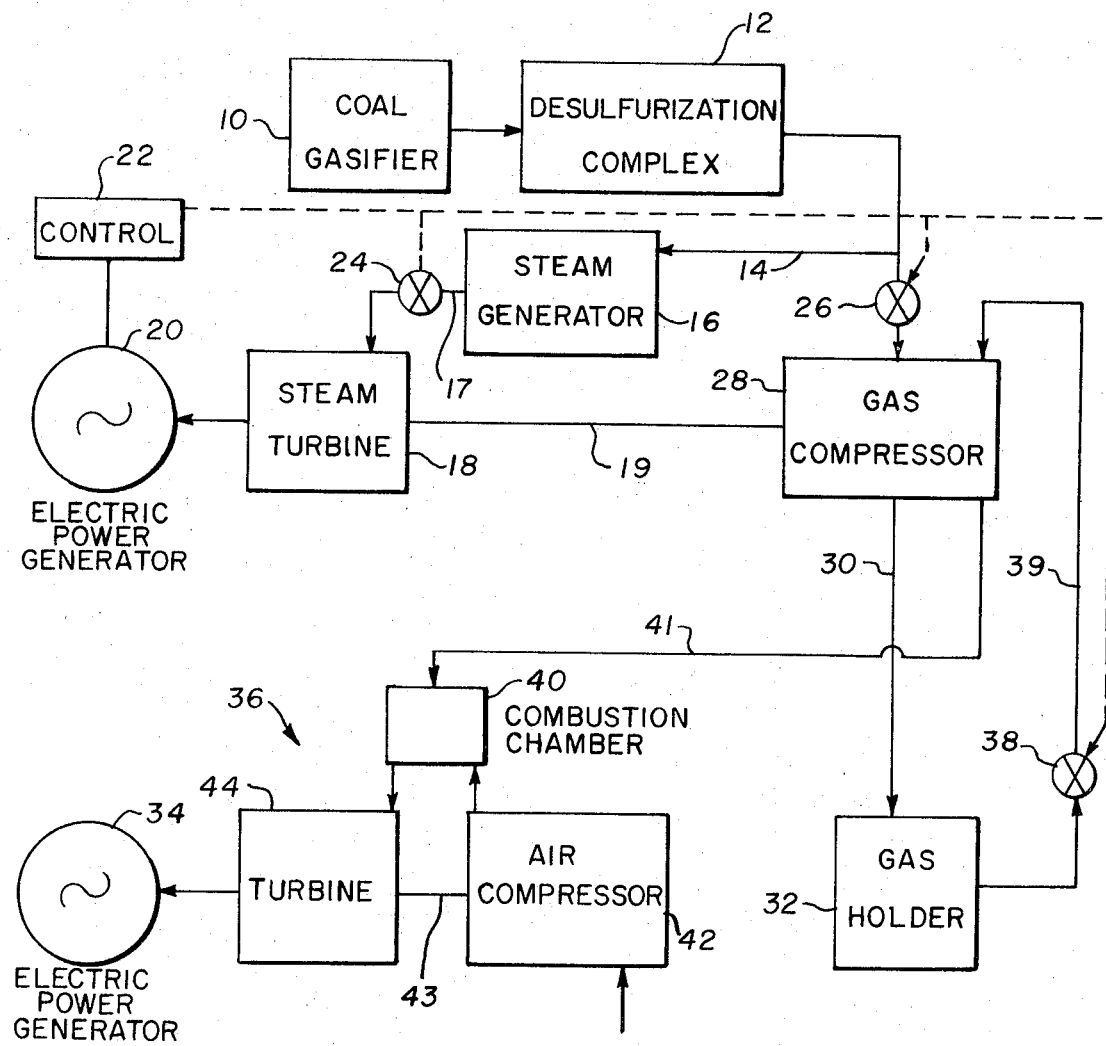

COMBINED STEAM AND GAS TURBINE POWER PLANT HAVING GASIFIED COAL FUEL SUPPLY

BACKGROUND

1. Field of the Invention

This invention relates to a combined steam turbine and gas turbine electric power generating plant. More specifically it relates to such a plant wherein both the steam and gas generating systems are fired with gaseous fuel produced in a coal gasifier.

2. Description of the Prior Art

Gas turbines have often been used in electric power generating plants, in combination with conventional steam power plants, to provide a peak-load capability. In such applications, expensive premium fuels such as natural gas or No. 2 oil are used to fire the gas turbine when it is needed.

Another type of power plant currently being actively investigated is the steam plant where the boiler is fired by a low Btu gas produced by the gasification of coal. Such systems, when they include a facility to desulfurize the low Btu gas before burning it in the boiler, are particularly attractive because of the low level of atmospheric pollutants emitted therefrom.

Most electric power generating plants operate at a load factor of about 50–70, percent which means that the power produced and thus the demand on the steam generator is, on the average, considerably less than the maximum capacity of the plant. In spite of this, however, the gasifier in a system using low Btu gasified coal as the only fuel, must be sized to be able to continuously generate a sufficient supply of gas to run the steam generator at its maximum capacity. To do otherwise would be analogous to designing a conventional pulverized coal burning steam generator with a coal delivery system unable to supply the quantity of coal required to operate at maximum capacity. As a result of this requirement the gasifiers used in such systems must be capable of efficiently following the varying load changes on the steam generating plant, and in fact, due to the low load factor, they will operate a great deal of the time at significantly less than their maximum level. Such operation results in an inefficient utilization of capital equipment which accordingly detracts from the economic attractiveness of the system. Also gasifiers generally operate less efficiently from the standpoint of carbon utilization when operating at low output levels.

BRIEF SUMMARY OF THE INVENTION

The present invention is directed to an integrated electric power generating plant employing: a coal gasifier as a fuel source, a steam generating plant sized to handle base and intermediate power demands, and a gas turbine to handle peaking loads on the plant.

During periods of low demand on the plant a gas holder is charged, through a compressor, with gas from the gasifier which is in excess of that required to fire the steam generator. When peaking is required the gas turbines are operated using the fuel accumulated in the gas holder during the periods of low demand. During peaking operations all of the fuel generated in the gasifier is sent directly to the steam generator. Also during peaking the gas compressor used to charge the gas holder during low demand is used to compress gas from the gas holder to the required gas turbine combustor fuel inlet pressure.

Such an integrated system provides the following advantages over the prior art: (1) The peaking gas turbines are operated without using high cost premium fuels. (2) Charging of the gas holder during low load factor operation permits the coal gasification plant to operate at a more steady load. (3) The energy used to drive the gas compressor during low load factor operation is recovered in the gas turbines during peaking operation.

Other objects and advantages of the invention will become apparent upon reading the following detailed description of an illustrative embodiment and upon reference to the drawing.

BRIEF DESCRIPTION OF THE DRAWING

The drawing is a simplified schematic of an integrated system according to the present invention. DESCRIPTION OF THE PREFERRED EMBODIMENT Referring to the drawing, numeral 10 indicates a coal gasifier for producing a low Btu gaseous fuel. In a typical system this gasifier 10 is an entrainment type gasifier in which pulverized coal, air and steam are reacted, in suspension, at a high temperature to form a fuel gas containing primarily carbon monoxide and hydrogen. The gasifier of course may be one of the other well known types such as a fixed bed or fluidized bed gasifier. The gas produced in the gasifier is passed to a desulfurization complex 12 where sulfur compounds, such as hydrogen sulfide, are removed by means of any one of several well known processes such as solvent absorption, or recently developed dry absorption processes.

A portion of the gas exiting from the desulfurization complex 12 passes via a suitable conduit 14 to the steam generator 16 where it is fired in a conventional manner to produce heat and thereby generate steam in the boiler. Steam from the steam generator is directed through a conduit 17 and steam supply valve 24 to the steam turbine 18 to drive the turbine to provide mechanical power which in turn drives the first electric power generator 20, and thereby generates electricity.

The load on the first power generator 20 is monitored by a quick-action load responsive control arrangement 22 of known construction. One of the functions of the control 22 is to regulate the quantity of steam permitted to enter the turbine 18 in accordance with the change of output of the generator 20, by varying the opening of steam supply valve 24 this permits the system to respond quickly to fluctuating demand levels on the power generator 20. The load responsive control 22 also serves to regulate the fuel flow to the steam generator by means of gas flow valve 26. At times of maximum load on the generator 20 the gas flow valve 26 is closed completely so that all of the output from the gasifier is directed to the steam generator 16.

During periods of less than maximum load on the generator 20 the gas flow valve 26 is caused to open in proportion to the load level, thereby permitting a portion of the gaseous fuel from the gasifier 10 to pass to the gas compressor 28. This compressor 28, in a typical system, will bring the gas to a pressure of about 150 psig and direct it by way of conduit 30 to the gas holder 32 where it is maintained in storage at that pressure.

The gas compressor 28 may be driven directly from the steam turbine 18, as shown in the drawing via drive shaft 19, or it may have a separate power source.

The first power generator 20 is sized to satisfy base and intermediate load demands on the power plant. Thus, during these periods of operation the gasifier 10 is run at a more or less constant load, with a quantity of the gas produced being directed to the steam generator 16, as required, with the excess being compressed and stored in the gas holder 32.

When the demand on the first generator 20 reaches a predetermined maximum level the peaking generator 34, driven by the gas turbine system 36, is placed into operation. This predetermined maximum demand level in a typical system will be sensed by the load responsive control 22, which in turn causes the gas turbine fuel valve 38 to open. Under such conditions, as pointed out above, the gas flow valve 26 will be closed completely so that all gas coming from the desulfurization complex is passed directly to the steam generator, and the steam supply valve 24 will be wide open. With the gas turbine fuel valve 38 open, compressed fuel from the gas holder 32 flows through conduit 39 to make a second pass through the gas compressor 28 and then through conduit 41 to the gas turbine combustion chamber 40 where it is burned. The combustion in the gas turbine combustion chamber is sustained by air provided to the chamber from the air compressor 42 of the gas turbine 36. This compressor being driven by the gas turbine through shaft 43 as is conventional. The hot combustion products from the chamber 40 are then directed through the turbine 44 to drive the peaking power generator 34.

The work done on the gas from the gas holder 32 during its second pass through the gas compressor 28 is dependent upon the instantaneous pressure in the gas holder and the inlet pressure of the combustion air to the gas turbine combustion chamber 40 as provided by the turbine air compressor 42. In order to insure that the gaseous fuel will flow freely into the combustion chamber at all times, the gas pressure in the fuel delivery line 41 must be maintained at a pressure which is sufficiently high to overcome the pressure drops which are inherent in the combustion chamber fuel control and injection system (not shown) which is of conventional design and considered an integral part of the gas turbine system. This pressure, of course, is always greater than the discharge pressure of the gas turbine compressor 42.

If the gas holder pressure is greater than or equal to the required pressure the compressor need do no work initially. However, as the gas supply from the gas holder 32 is used up, the pressure in the holder may drop below the turbine air inlet pressure and the gas compressor 28 must be used to bring the fuel up to the required pressure before directing it to the combustion chamber 40.

If the gas holder 32 storage pressure is always less than the turbine air inlet pressure then the compressor 28 must operate, whenever the turbine is on the line, to raise the pressure of the gas from the gas holder 32 to the desired pressure before delivering it to the turbine combustion chamber 40. Under such circumstances the gas compressor 28 is of the type which is capable of operating at two discharge pressures, i.e., a low pressure for use when charging the gas holder, and a high pressure for bringing the gas up to a pressure greater than the inlet air pressure to the combustion chamber 40. In a typical system the compressor may operate during normal service to bring the gas from the desulfurization complex from a pressure of 15 psia to 150 psia for storage, while during use for delivering gas to the gas turbine it will further raise the gas pressure to 175 psia. In any event, of course, the energy used to drive the gas compressor 28 both during low load conditions, and in bringing the gas pressure up to pressure which will permit free flow into the combustion chamber, will be recovered in the gas turbines during their peaking operation.

While a preferred embodiment of the invention has been shown and described, it is to be understood that such showing is merely illustrative and that changes may be made without departing from the spirit and scope of the invention as claimed.

What is claimed is:

1. An electric power generating plant comprising:
   a. a coal gasification complex for production of a gaseous fuel;
   b. a steam generator fired by said gaseous fuel;
   c. a steam turbine receiving steam from said steam generator;
   d. a first electric power generator connected to and driven by said steam turbine;
   e. a storage tank for storing said gaseous fuel;
   f. means for controlling the flow of gaseous fuel from said coal gasifier to said steam generator in response to increases and decreases in power demand on said first power generator;
   g. means for flowing the gaseous fuel from said coal gasifier which is not directed to said steam generator to said storage tank;
   h. a gas turbine fired by said gaseous fuel, said gas turbine comprising an air compressor, a combustion chamber and a turbine section;
   i. a second electric power generator connected to and driven by said gas turbine; and
   j. means for flowing gaseous fuel from said storage tank to said gas turbine combustion chamber to be combusted therein when the power demand on said first power generator is greater than a predetermined level.

2. An electric power generating plant according to claim 1 wherein said means for flowing gaseous fuel to said storage tank comprises a conduit and a gas compressor disposed therealong for compressing said gaseous fuel prior to storage in said tank.

3. An electric power generating plant according to claim 2 wherein said gas compressor is driven by said steam turbine.

4. An electric power generating plant according to claim 2 wherein said means for flowing gaseous fuel from said storage tank to said gas turbine includes means for compressing said fuel a second time to bring the gas pressure to a pressure at least as high as the inlet pressure of the air to the combustion chamber from said air compressor.

5. An electric power generating plant according to claim 4 wherein said means for compressing said fuel includes said gas compressor.

6. A method of operating an electric power generating plant having a coal gasifier, a steam turbine power plant including a steam generator and steam turbine driving a first electric power generator, and a gas turbine power plant driving a second electric power generating plant comprising the steps of:
- producing a gaseous fuel in said gasifier;
- burning at least a portion of said gaseous fuel in said steam generator to produce heat for the generation of steam therein;
- expanding steam from said steam generator in said steam turbine to generate mechanical energy therein for driving said first electric power generator;
- controlling the flow of gaseous fuel from said gasifier to said steam generator in response to changes in power demand on said first power generator;
- storing gaseous fuel from said gasifier which is not burned in said steam generator during periods of power demand on said first power generator less than a predetermined level; and
- burning stored gaseous fuel in said gas turbine power plant to drive said second electric power generator when the power demand on said first power generator is above said predetermined level.

7. A method according to claim 6 including raising the pressure of said gaseous fuel prior to storing it and wherein said storage is carried out at such elevated pressure.

8. A method according to claim 7 including further compressing said stored gaseous fuel prior to burning it in said gas turbine.

* * * * *